(12) United States Patent
Lindsten et al.

(10) Patent No.: US 7,537,445 B2
(45) Date of Patent: May 26, 2009

(54) INJECTION MOLDING ASSEMBLY HAVING A PRODUCT REMOVER WITH A BIASING MEMBER

(75) Inventors: Robert C. Lindsten, St. Charles, IL (US); Glenn E. Nobis, Hanover Park, IL (US)

(73) Assignee: Trelleborg Sealing Solutions US, Inc., Streamwood, IL (US)

( * ) Notice: Subject to any disclaimer, the term of this patent is extended or adjusted under 35 U.S.C. 154(b) by 358 days.

(21) Appl. No.: 11/553,837

(22) Filed: Oct. 27, 2006

(65) Prior Publication Data

US 2008/0102155 A1 May 1, 2008

(51) Int. Cl.
*B29C 45/40* (2006.01)
(52) U.S. Cl. .................. 425/438; 425/436 R; 425/441; 425/556; 425/DIG. 58; 425/DIG. 127
(58) Field of Classification Search ................. 425/556, 425/436 R, 441, 444, 443, 438, DIG. 127, 425/DIG. 58
See application file for complete search history.

(56) References Cited

U.S. PATENT DOCUMENTS

| | | | |
|---|---|---|---|
| 1,802,281 A | 4/1931 | Shimer | |
| 1,865,464 A * | 7/1932 | Geyer | 425/577 |
| 2,984,895 A | 5/1961 | Griffin, Jr. et al. | |
| 3,463,058 A | 8/1969 | Rockwell | |
| 3,655,208 A | 4/1972 | Walker | |
| 3,897,929 A * | 8/1975 | Hartmann | 249/105 |
| 3,950,119 A * | 4/1976 | Reichenbach | 425/129.1 |
| 4,067,093 A | 1/1978 | Schumacher et al. | |
| 4,496,302 A * | 1/1985 | Brown | 425/547 |
| 4,938,679 A * | 7/1990 | Pietrorazio | 425/437 |
| 5,018,962 A * | 5/1991 | Kitamura et al. | 425/556 |
| 5,037,290 A * | 8/1991 | Curliss et al. | 425/556 |
| 5,076,882 A * | 12/1991 | Oyanagi et al. | 156/500 |
| 5,158,736 A * | 10/1992 | Giza | 264/334 |
| 5,782,162 A | 7/1998 | Lanteigne et al. | |
| 5,934,685 A | 8/1999 | Danzer | |
| 6,206,681 B1 * | 3/2001 | Kawase et al. | 425/517 |
| 6,397,462 B1 | 6/2002 | Lanteigne et al. | |
| 2003/0160395 A1 | 8/2003 | Walden | |

* cited by examiner

*Primary Examiner*—James Mackey
*Assistant Examiner*—Emmanuel S Luk
(74) *Attorney, Agent, or Firm*—K & L Gates LLP

(57) ABSTRACT

An injection molding assembly having a mold cavity assembly, a stripping apparatus and a mold core assembly. These components are movably coupled together and configured to extract, remove or eject a molded part. The injection molding assembly also includes a biasing member or force transceiver to facilitate in the removal of the molded part from the mold core.

22 Claims, 12 Drawing Sheets

INJECTION MOLDING ASSEMBLY HAVING A PRODUCT REMOVER WITH A BIASING MEMBER

CROSS REFERENCE TO RELATED APPLICATIONS

The present disclosure relates to the following co-pending commonly owned U.S. patent application: "METHOD FOR MANUFACTURING SEALING RINGS," U.S. application Ser. No. 11/553,863 filed Oct. 27, 2006.

BACKGROUND

Companies use molding equipment to manufacture piston rings. For example, piston rings are manufactured through an injection molding process. As piston rings are cylindrical, they are formed in tapered cylindrical shaped molding equipment. In general, the known molding equipment for piston rings includes a mold cavity wall and a core. Pellets or granules of thermoplastic materials are heated to a molten state and forced into the space defined by the mold cavity wall. After the molten thermoplastic material has set or cured, there is a difficulty in removing the cured thermoplastic material from the cylindrical mold core as the material contracts upon the mold core causing an increased level of friction between the core and the generally tube-shaped or cylindrically shaped intermediate product to be ejected or separated. Consequently, the mold core of the molding equipment is limited in length and further includes a tapered or slanted surface to facilitate product ejection. However, the tapered surface of the mold core causes the intermediate product to have a tapered interior profile. The excess material caused by the tapered profile must be trimmed off to give a substantially constant diameter to the resultant piston ring. This waste material results in manufacturing inefficiencies.

In addition, the limited length of the intermediate product results in further manufacturing inefficiencies. This is because companies cut the intermediate product into slices to form the piston rings. Having shorter intermediate products increases the changeover time in moving from one intermediate product to another. Therefore, there is a need to overcome the disadvantages described above, or otherwise lessen the effects of such disadvantages.

SUMMARY

The present disclosure generally relates to an injection molding apparatus and a method of manufacturing piston or sealing rings using the injection molding apparatus is provided.

In an embodiment, a method of manufacturing sealing rings includes forming a cylindrical or nearly cylindrical intermediate tube-shaped product using an injection molding apparatus having a biasing member that assists in ejecting the intermediate product from the injection molding apparatus. After the intermediate product has been cured in the molding chamber, the product is withdrawn from the mold core by a power source as well as a biasing member disposed in the injection molding apparatus. In general, the biasing member is positioned within the injection molding apparatus such that the biasing member transmits a force to a stripping plate in the opposite direction of the force applied by the power source. Accordingly, the biasing member provides a dampening effect and a reinforcing effect to the separating force provided by the power source, where these effects assist in the ejection of the intermediate product from the mold core. Therefore, the biasing member augments the ability of the power source to withdraw the product from the mold core. As such, an intermediate product can be withdrawn from a substantially cylindrical and relatively long mold core.

In an embodiment, after the intermediate-product has been ejected, excess material is trimmed off of an inner surface and outer surface of the product with a trimming apparatus. The trimming apparatus includes two trimming elements that simultaneously trim material from the inner and outer surfaces while the intermediate product spins on a rotating lathe. Because the intermediate product was able to be formed from a substantially cylindrical mold core, there is a decrease in waste material.

The trimmed product is then divided by a different cutting apparatus into a plurality of sealing rings having improved dimensional tolerances. Because the intermediate product is long, several sealing rings can be formed from a single tub-shaped product, thus increasing manufacturing efficiency.

Additional features and advantages are described herein, and will be apparent from, the following Detailed Description and the figures.

DETAILED DESCRIPTION

1. Overview

Figure 1A:
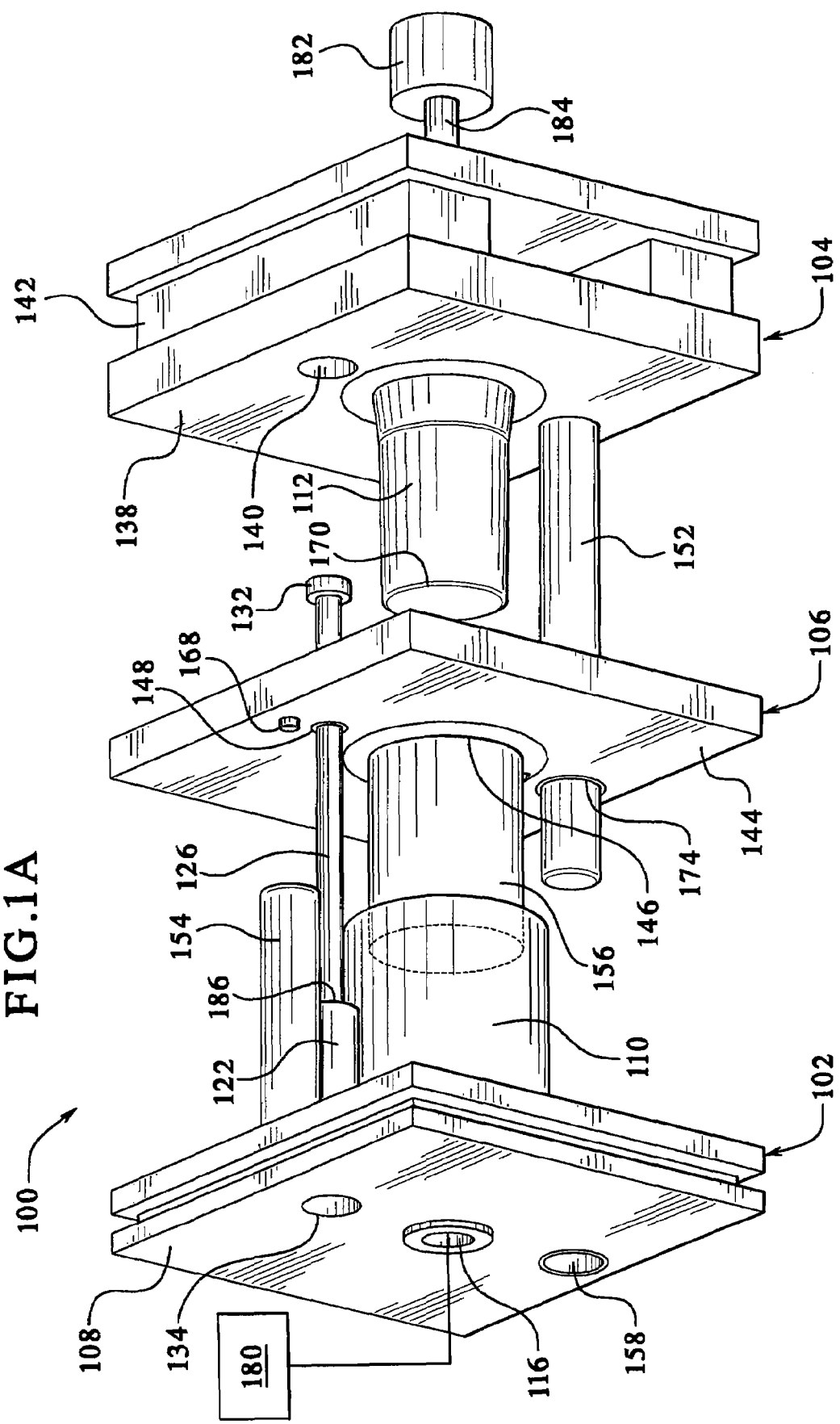
FIG. 1A is a perspective view of an injection molding apparatus, according to an embodiment.

A piston, which can be configured as a plug or cylindrical disk, slides within the inside bore of a cylinder. The general purpose of a piston is to either change an enclosed volume inside the cylinder, or to exert a force on a fluid inside the cylinder. Pistons can be involved in high-pressure hydraulic piston and cylinder apparatuses such as in heavy construction equipment and other machines. In one example of a piston used in a high-pressure hydraulic application, an excavator may be equipped with hydraulic cylinders and pistons to actuate movement of a boom, arm, thumb or bucket attached to the body of the excavator. Cylindrical sealing rings, such as piston rings, seals, bearings, wear rings, and expander combinations, can be mounted to an outer wall of a piston body to restrict leakage around the piston within the cylinder chamber. For example, a sealing ring may be mounted in an annular groove formed in the piston body. In one embodiment, an injection molding assembly is operable for manufacturing cylindrical sealing rings. However, it should be appreciated that the injection molding assembly and method of manufacturing sealing rings may be applied to an injection molding application other than for making non-cylindrical sealing rings suitable for products such as irregular or other non-uniform shaped products.

The injection molding process, in one embodiment, involves liquidized thermoplastic pellets or granules which are injected or forced into a die chamber, cooled, and then later ejected from the injection molding assembly. The die chamber includes a space that is defined by inserting a mold core (i.e., the male molding portion) into a mold cavity wall (i.e., the female molding portion). Due to a thermal contraction characteristic of the thermoplastic material, the molded product contracts onto the mold core during the setting or solidifying process. The mold is removed or drawn from the molding assembly after it has set or cured. According to an embodiment, the molding assembly includes a product remover or stripping apparatus or separator (described in detail below) to forcibly eject the set product from the mold core when the mold core is moved away from the mold cavity assembly.

1.1 Product Formation

In an embodiment, palletized or granular thermoplastic material is poured into a feed hopper, which is a large open bottomed container. The feed hopper feeds the pellets or granules down into a heated cylinder (not shown) where they are heated to a liquid or semi-liquid state. In an embodiment, the thermoplastic molding material is a glass-filled Nylon polymer. However, it should be appreciated that any other suitable thermoplastic material such as polystyrene, ABS or acrylonitrile butadiene styrene, nylon, polypropylene, polyethylene, and polyvinyl chloride ("PVC") may be used. The material is then forced under pressure by an injection plunger or rotating screw system (not shown) through an injection port and into a mold chamber. In an example of a rotating screw system, the screw is turned by a hydraulic or an electric motor (not shown) that turns the screw feeding the pellets up the screw's grooves. As the screw rotates, the pellets are moved forward in the screw and they undergo extreme pressure and friction which generates some of the heat needed to melt the pellets. Heaters (not shown) on either side of the screw assist in the heating and temperature control around the pellets during the melting process. The rotating screw moves a predetermined distance corresponding to the volume of the material to be injected. In an embodiment, the injection molding assembly includes venting means to expel the volume of air in the die chamber displaced by the injected molten material. When the predetermined amount of liquid material has been forced in to the die chamber, the screw stops turning. The molten material is then cooled or allowed to cool to set or solidify the thermoplastic material. Because the thermoplastic material has a thermal contract characteristic associated with a reduction in temperature, the solidified product contracts upon the mold core (i.e., the male molding portion).

1.2 Product Extraction

After the product has cured, a motor withdraws the mold core from the mold cavity wall. Because the cured product has contracted upon the mold core, the product is withdrawn along with the mold core. In an embodiment, the injection molded assembly includes a stripping apparatus (explained in detail below) that causes the product to be ejected or removed or stripped from the mold core as the mold core is drawn away from the mold cavity wall. The ejected product falls away from the injection molding assembly and is then available for additional processing steps. The mold core of the injection molding assembly is then reinserted into the molding cavity and the above process is repeated.

2. Injection Molding Assembly

In an embodiment, the injection molding assembly 100 includes a plurality of subassemblies 102, 104, 106 and 182. These and/or other subassemblies may be movably mounted to a common frame (not shown) or support structure to effect a proper placing and alignment of the subassemblies when forcing the components or subassemblies together and apart. Referring to the embodiment shown in FIG. 1A, the injection molding assembly includes a mold cavity assembly 102, a core assembly 104, a stripping apparatus 106, and a power source 182 coupled to the core assembly 104 by a force transmitter 184.

In one embodiment, the mold cavity assembly accepts the liquidized thermoplastic material from a feed hopper or supply 180 and reciprocating screw (not shown). The core assembly 104 and stripping apparatus 106 are moved toward and away from the mold cavity assembly 102 by the power source 182 and through the force transmitter 184. The power source 182 may be a motor, actuator or any other suitable electric, electromagnetic, pneumatic, electromechanical or any other suitable moving device such as a compress. The force transmitter 184 may be a rod, a screw, or any other suitable mechanism capable of transmitting a force from the power source 182 to the core assembly 104 and stripping apparatus 106. In an embodiment, the stripping apparatus 106 is disposed between the mold cavity assembly 102 and the core assembly 104. In a product formation step, the core assembly 104 and the stripping apparatus 106 are in a closed state (see, FIG. 2B). During a product ejection stage, the core assembly 104 and the stripping apparatus 106 are moved away from the mold cavity assembly to allow the cured product to be ejected (see, FIG. 1A). The mold cavity assembly, core assembly and stripping apparatus are described in detail below.

2.1 Mold Cavity Assembly

Referring to FIG. 1A, the mold cavity assembly 102 includes a base 108 member. The base or support 108 of the mold cavity assembly 102 may be made of any suitable material including ceramics or a metal such as aluminum, steel, stainless steel, carbon steel, titanium, or alloys thereof. However, it should be appreciated that the base or support 108 may be made of any suitable metal or ceramic material that can accommodate a molten or liquid thermoplastic material. In the example embodiment illustrated in FIG. 1A, the support 108 is a generally square-shaped flat plate. However, it should also be appreciated that any suitable shaped support may be used such as a circular support or a rectangular support. A mold cavity wall 110 is attached to the support 108. In the illustrated embodiment, where the desired product is a intermediate product, the mold cavity wall 110 is a cylindrical shape defining an inner cylindrical mold cavity. However, it should be appreciated that the shape of the mold cavity wall 110 may be any suitable shape appropriate to the desired product shape. An injection port or liquid material receiver 116 of the support 108 receives liquid thermoplastic material pumped into the mold cavity wall 110.

Figure 1B:
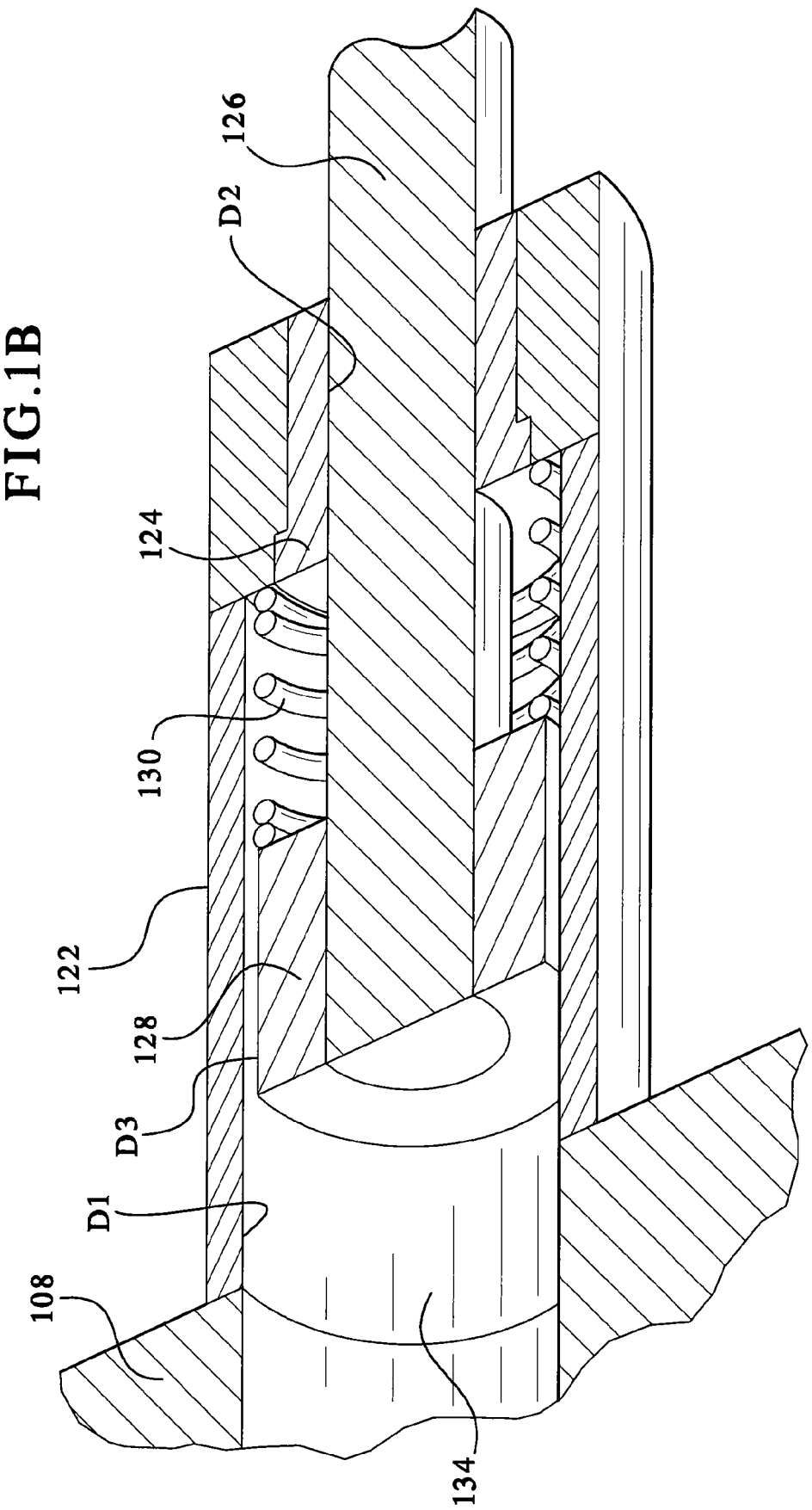
FIG. 1B is a perspective of a stripping rod holder that houses a portion of a stripping rod and a spring mechanism.

A stripping rod shoulder, receiver, support or holder 122 is attached to or integrally formed with the support 108. In an embodiment, the stripping rod holder 122 is a hollow cylinder that is configured to house or hold an end of a stripping rod 126 (described in detail below). In an embodiment, a portion of the stripping rod 126 may pass through a second opening 134 of the support 108. The stripping rod stripping holder 122 has an inside diameter D1, as shown in FIG. 1B. The stripping rod stripping holder 122 further includes a stepped or flanged portion 124 having a diameter D2, where the diameter D2 is less than the diameter D1. The flanged portion 124 of the stripping rod holder is configured to obstruct or block a flanged end or head 128 of the stripping rod 126 from completely passing through the bottom opening 186 of the stripping rod holder 122.

In an embodiment, the stripping rod 126 includes a flanged end or head 128 that is slidably housed in the stripping rod holder 122 and another flanged end 132 that coupled to the stripping apparatus 106 and the core assembly 104 (described in detail below). The flanged end 128 is cylindrical to correspond to the cylindrical shaped of the stripping rod holder 122. An outer diameter of the flanged end 128 (see, FIG. 1B, D3) is less than the inside diameter D1 of the stripping rod stripping holder 122. This allows the flanged end 128 of the stripping rod 126 to slide within the stripping rod holder 122 as the core assembly 104 and stripping apparatus 106 move relative to the mold cavity assembly 102 (described in detail below). As shown in FIG. 1B, the outer diameter D3 of the flanged end 128 of the stripping rod is greater than the inside diameter of D2 of the flanged end 124 of the stripping rod holder 122. Accordingly, as the stripping rod moves relative to the stripping rod holder and the flanged end 128 of the stripping rod 126 contacts the flanged end 124 of the stripping rod holder 122, the stripping rod 126 is obstructed or blocked from passing out of the stripping rod holder 122. Therefore, the movement of the stripping rod 126 relative to the support plate 108 is limited.

In an embodiment, a biasing member, force transceiver, rebounder or spring mechanism 130 is disposed between the flange 128 of the stripping rod 126 and the flange 124 of the stripping rod holder 122. As shown in the embodiment illustrated in FIGS. 1B and 2A, the spring mechanism 130 includes a coil type spring. However, it should be appreciated that the spring mechanism may include any suitable rebounding member or biasing device such as a coil spring, a helical compression spring, a helical tension spring, a leaf spring, a torsional spring, or any other suitable structure that provides for storage of at least a portion of the kinetic energy associated with the movement of the injection molding assembly 100 components or subassemblies. The stored energy is then released as a rebound effect to urge one or more of the subassemblies to move in a different direction. In other embodiments, the biasing member may be a pneumatic or a hydraulic shock absorber in the form of a cylinder with a sliding piston inside. In this embodiment, the cylinder is filled with a fluid, such as hydraulic fluid or air. A certain amount of kinetic energy is stored as the fluid is compressed. The subsequent decompression of the fluid is the rebound effect. In addition, a certain amount of the kinetic energy may be dissipated as heat or otherwise absorbed by the system. The biasing member or rebounder may also be a rubber disk, a rubber band, an elastic cord, a magnetic or electromagnetic system, or any other suitable structure that provides for storage and release of kinetic energy as a rebound effect. It should also be appreciated that, in place of the spring mechanism 130, the mold cavity assembly 102 can include any suitable force transceiver, such as any suitable device to receive a force and transmit a force.

In the embodiment where the biasing member or rebounder is a spring mechanism 130, as the stripping rod 126 moves relative to the stripping rod holder 122, the flanged end 128 of the stripping rod 126 contacts the spring mechanism 130 and causes the spring mechanism to contract. Accordingly, the contraction of the spring mechanism 130 results in a biasing force that provides a dampening effect to the collision or impact of the stripping rod 126 with the stripping rod holder 122. Moreover, the spring mechanism 130, in a compressed state (see, FIG. 2D), produces a biasing force that opposes the separating force applied to the core assembly 104 by the motor 182 (described in further detail below). Accordingly, when the spring mechanism 130 is in a compressed state, the total force acting to separate the intermediate product 156 from the mold core 112 is the sum of the forces produced by the motor 182 and the spring mechanism 130 (i.e., which, in total, is greater than the force of the motor alone).

Referring to FIG. 1A, in an embodiment, the mold cavity assembly 102 includes a cylindrical spacer 154 or leader pin that is configured to contact the support 144 of the stripping apparatus 106, when the stripping apparatus is in a closed state. In an embodiment, a support 144 of the stripping apparatus 106 (described in detail below) or the spacer 154 may include a suitable sensor mechanism 168 that senses contact or lack of contact between the spacer 154 and the support 144. This sensor information is transmitted to a processor that controls movement of the core assembly 104 and stripping apparatus 106 with respect to the support 108. Therefore, the sensor mechanism is able to provide the motion control system with information concerning the relative positions of the injection molding assembly 100 subassemblies. In another embodiment, the spacer 154 simply serves as a hard stop that blocks the mold core 112 from being inserted too far into the mold cavity 110. As described below, there is an end cap 202 formed on an end of the intermediate product 156 that is defined by the space between the end of the mold core 112 and the bottom of the mold cavity 110.

In an embodiment, the support 108 of the mold cavity assembly 102 defines an opening 158. (See, FIG. 1A). The opening 158 is configured to receive a main guide rod 152 or leader pin (described in detail below) for the injection molding apparatus.

Therefore, in an embodiment, the mold cavity assembly 102 includes structure to facilitate introduction of the liquidized thermoplastic material into the mold core 110. The mold cavity assembly 102 also comprises structure to house a spring mechanism, where the spring mechanism provides a dampening effect and reinforcing or biasing effect to the relative movement of the stripping rod 126 and the mold cavity assembly 102. As described in further detail below, these dampening and biasing effects are transmitted through the stripping rod 126, to the stripping apparatus 106, and ultimately to a portion of the intermediate product 156 to aid in the eventual ejection or stripping or removal of the intermediate product 156.

2.2 The Core Assembly

As discussed above, the injection molding assembly 100, in an embodiment, includes a core assembly 104. The core assembly 104 includes a support member or support 138. The base or support 138 may be made of any suitable material including a ceramic or a metal such as aluminum, steel, stainless steel, carbon steel, titanium, or alloys thereof. It should be appreciated that any suitable metal or ceramic material may be used that can accommodate a molten or liquid thermoplastic material, as discussed above with referenced to the mold cavity assembly 102.

In the example embodiment illustrated in FIG. 1A, the base or support 138 is a square-shaped flat plate. However, any suitable base or support may be used such as a circular base or a rectangular base. The support 138 further includes a close-ended mold core 112. In an embodiment, the mold core 112 has a substantially cylindrical shape and a closed end 170. However, it should be appreciated that a mold core may be of any suitable profile such as ovular, rectangular, square or otherwise according to product specifications. In this example, the mold core 112 is substantially cylindrical and is configured to be received through an opening 146 of the stripping apparatus 106 (described in detail below) and into the mold cavity wall opening 114.

The outer diameter of the mold core 112 is less than the inner diameter of the inner wall 160 of the mold cavity wall 110. Therefore, the difference between the inner diameter of the mold cavity wall and the outer diameter of the mold core determined the thickness of the final tube shaped product.

In an embodiment, the length of the mold core 112 is less than the length of the mold cavity wall 110. (See, FIGS. 2B). Therefore, when the mold core 112 is fully inserted into the mold cavity wall 110, there is a space proximal to the injection port 118 that allows for the fluidized thermoplastic material to flow around the top end 170 of the mold core 112 and into the molding chamber 120 (see, directional arrows in FIG. 2B). As a result of the space near the top of the mold core 112, the tube shaped product is formed with an end cap 202. (See, FIGS. 2G, 3 and 4). This end cap 202 provides increased structural rigidity to the intermediate product 156, 200. This increased structural rigidity facilitates the division of the product into a plurality of piston rings having suitable or adequate dimensional tolerances (described in detail below).

In an embodiment, the mold core 112 includes a top end 170 having rounded or curved edge. (See, FIGS. 1A and 2A). In this embodiment, the interior of the mold cavity wall 110 includes a curved or rounded corner 172. Therefore, when the injection molding apparatus is in a closed state (see, FIG. 2B), the curved edge of the top end 170 and curved corner 172 provide a curved path for the fluidized thermoplastic material to flow through (see, directional arrows in FIG. 2B). Accordingly, the resistance to flow is decreased. The decrease in resistance to flow allows for a longer intermediate product 156, 200 to be formed using a longer mold core 112 and longer mold cavity wall 110. A longer intermediate product 156, 200 can be divided up into several piston rings, thus ultimately increasing manufacturing efficiency.

Figure 2A:
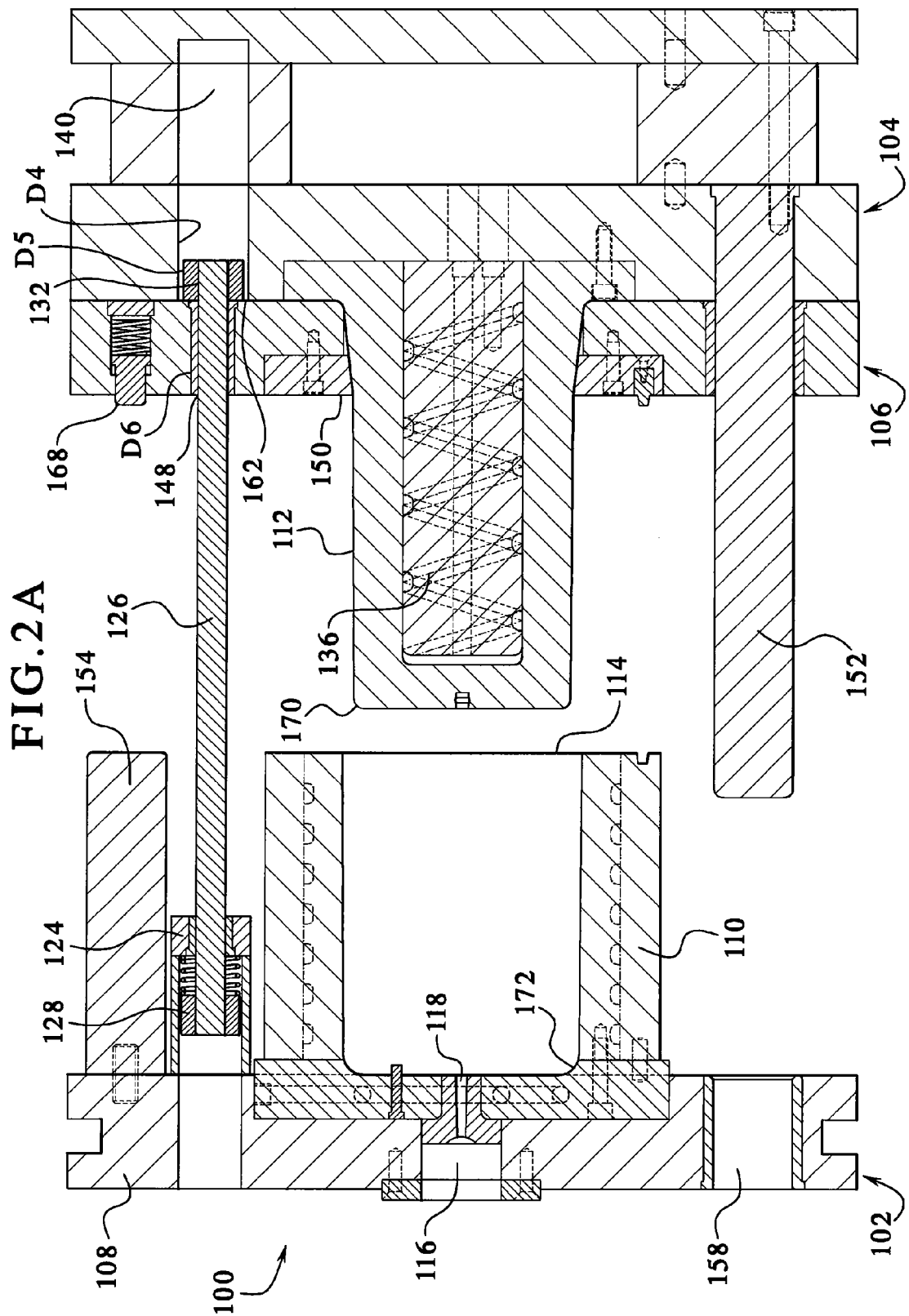
FIG. 2A is a cross-sectional view of the injection molding apparatus in a separated state.
Figure 2B:
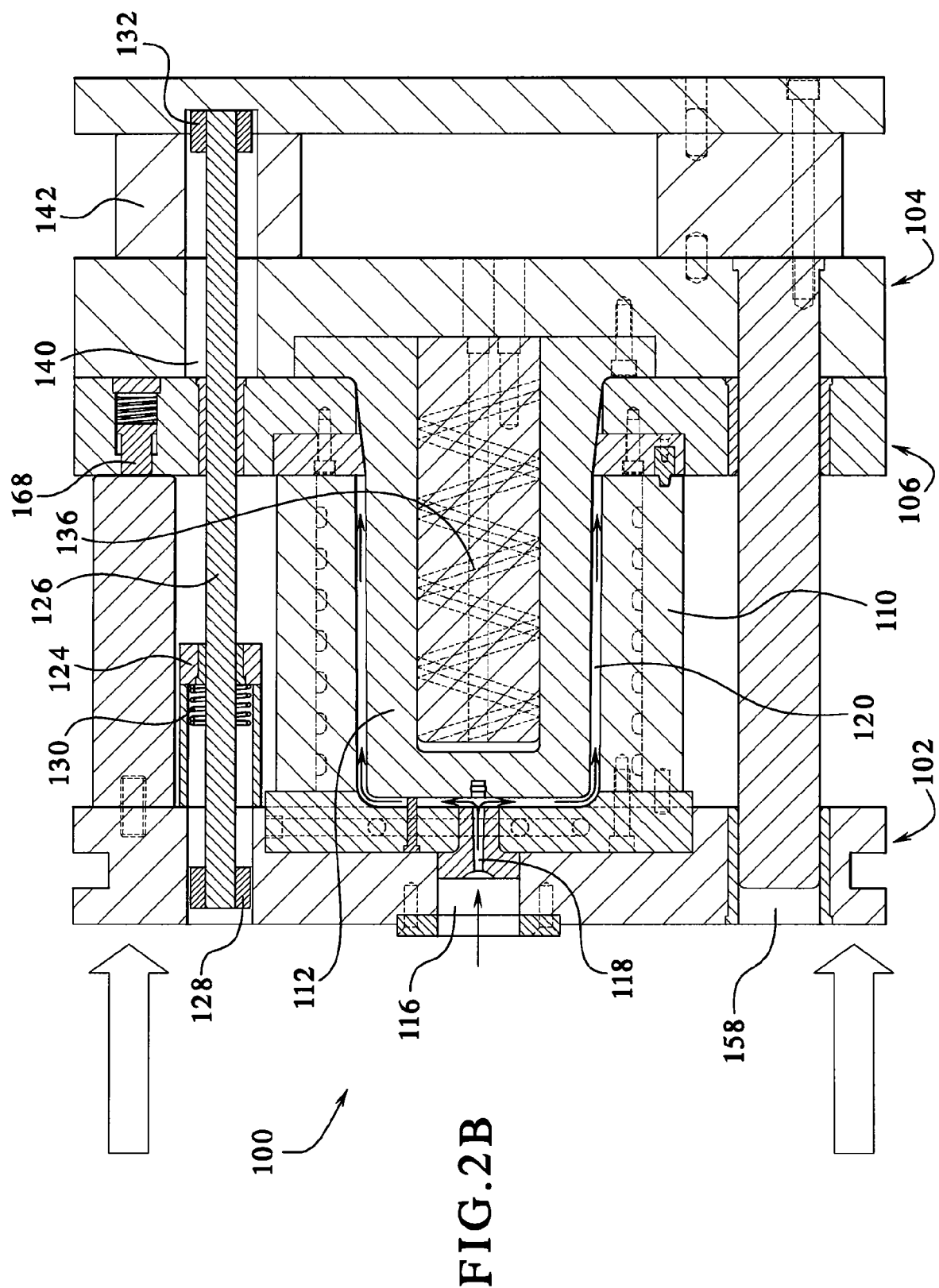
FIG. 2B is a cross-sectional view of the injection molding apparatus in a closed state as liquid thermoplastic material is being injected in the mold cavity wall.

Referring now to FIG. 2A, the core assembly 104, in an embodiment, defines cooling channels or a helical cooling coil 136 to assist in a cooling operation after the molten thermoplastic material has been introduced to the injection molding space 120 (see, FIG. 2B). It should be appreciated that the coolant may be a gas or a liquid such as water or ethylene glycol, or may be any other suitable coolant. In one embodiment, the support 138 of the core assembly 104 defines an opening 140 that is configured to removably hold or house the flanged end 132 of the stripping rod 126. (See, FIGS. 1A and 2B). In one example illustrated in FIG. 2B, the base 138 houses a portion of the stripping rod 126 when the injection molding assembly 100 is in a closed state. Therefore, it is not necessary for a portion of the stripping rod 126 to extend beyond the assembly.

In the example embodiment illustrated in FIGS. 1A and 2B, the support 138 of the core assembly 104 includes a spacer 142 to increase the thickness of the support 138. As mentioned above, the opening 140, provided in the support 138, creates a cylindrical recess to accommodate a portion of the stripping rod 130. In an embodiment, a main guide rod 152 or main leader pin is fixed to or integrally formed with the support 138, as mentioned above. The main guide rod 152 is received through a third opening 174 formed in the support 144 of the stripping apparatus and through a third opening 158 formed in the support 108 in the mold cavity assembly. The main guide rod functions, at least in part, to constrain the movement of the mold core 112 substantially along a common axis to the mold cavity 110 while the stripping apparatus 106 and core assembly 104 move longitudinally relative to the mold cavity assembly 102. Accordingly, a suitable or adequate dimensional tolerance can be realized in the intermediate product 156, 200 and the mold core 112 is positioned concentrically with respect to the mold cavity wall 110.

2.3 The Stripping Apparatus

The injection molding assembly 100 also include a product remover or separator or stripping apparatus 106, as discussed above. The stripping apparatus 106 functions to separate, strip or eject the cured intermediate product 156 from the mold core 112. The product remover or stripping apparatus 106 is disposed between the mold cavity assembly 102 and the core assembly 104. The stripping apparatus 106 includes a base or support 144 member. The stripping apparatus base or support 144 may be made of any suitable material including a ceramic or a metal such as aluminum, steel, stainless steel, carbon steel, titanium or alloys thereof as discussed above with reference to the mold cavity assembly base or support 108. In the example embodiment illustrated in FIG. 1A, the support 144 is a square-shaped flat support corresponding to the square shape of the mold cavity assembly support 108 and the core assembly support 138. However, it should be appreciated that any suitably shaped support or base may be used such as a ovular shape, a rectangular shape or any other suitable shape. The support 144 includes an opening 146, which is configured to receive the cylindrical mold core. The opening 146 of the support 144 includes a force transmitter 150 that contacts the end surface of the mold cavity wall 110. As described below, the edge 150 transmits the force necessary to eject the solidified thermoplastic intermediate product 156 from the mold core 112. The support 144 of the stripping apparatus 106 also defines a second opening 148 configured to receive the stripping rod 126. (See, FIGS. 1A and 2A).

As illustrated in FIG. 1A, the flanged end 132 of the stripping rod 126 is inserted through the first opening 148 of the stripping apparatus support 144 and also into the stripping rod holder 122 of the mold cavity assembly 102. As shown in FIG. 2A, the opening 140 of the core assembly 104 has an inside diameter D4 that is larger than an outside diameter D5 of the flanged end 132 of the stripping rod 126. Accordingly, the stripping rod 126 can move longitudinally with respect to the opening 140 of the core assembly 104. In addition, the diameter D5 of the flanged end 132 is greater than the inside diameter D6 of the opening 148 of the stripping apparatus support 144. Accordingly, the flanged end 132 of the stripping rod 126 is obstructed from being pulled through the opening 148 of the stripping apparatus support 144. It follows that as the core assembly 104 and stripping apparatus 106 are separable by a maximum distance. This maximum distance between the stripping apparatus 106 and the mold cavity assembly 102 is determined, at least in part, by the length of the stripping rod 126 between the flanged end 124 of the holder 122 of the mold cavity assembly 102 and the flanged end 132 of the stripping rod 126. (See, FIG. 2D). This maximum distance of the stripping apparatus from the mold cavity assembly is achieved when the flanged end 132 of the stripping rod has fully compressed the spring mechanism 130 and when the second flanged end 132 of the stripping rod is in contact with the support 144 of the stripping apparatus 106. (See, FIG. 2D). At this point of maximum separation, the motor 182 applies a continuous force to provide, in combination with the biasing force of the spring activated force transmitter or spring mechanism 130, a cyclical or oscillating or periodic shock to the intermediate product 156 to eventually withdraw the core assembly 104 away from both the mold cavity assembly 102 and the stripping apparatus 106 (i.e., to eject the intermediate product 156 off of the mold core 112).

Although the stripping apparatus 106 has a maximum separation distance determined by the length of the stripping rod 126, the mold core assembly 104 may be moved further apart from the stripping apparatus 106 and the mold cavity assembly 102. This is because the flanged end 132 of the stripping rod 126 is removably connected with the hole 140 in the support 138 of the mold core assembly 104.

According to an embodiment, in a product ejection or separation operation, the following steps occur:
  (a) the motor 182 applies a force through the force transmitter 184 to the core assembly 104;
  (b) the core assembly 104, stripping apparatus 106 and intermediate product 156 are moved away from the mold cavity assembly 102, wherein the movement is guided by the main guide pin 152 and stripping rod 132;
  (c) the core assembly 104, stripping apparatus 106 and intermediate product 156 are moved further away from the mold cavity assembly 102 such that the spring mechanism 130 is compressed to generate a biasing force from the spring mechanism 130 that opposes the direction of the force from the motor 182;
  (d) when the spring mechanism 130 is fully compressed, a reaction force is generated by the contact of the flanged end 132 of the stripping rod 126 with the base 144 of the stripping apparatus 104;
  (e) the core assembly 104, stripping apparatus 106 and intermediate product 156 move back and forth with respect to the mold cavity assembly 102 in an oscillating fashion to provide a periodic shock or force applied to the intermediate product 156 from the separator 150, where the oscillation is caused by the biasing force of the spring mechanism 130 and/or a cycling of the power output of the motor 182, where other mechanical or dynamic forces or factors may also have an effect on the oscillation; and
  (f) after the $x^{th}$ oscillation, the intermediate product 156 is separated or ejected from the mold core 112.

With regard to the separator 150 of the stripping apparatus 106, when the core assembly 104, stripping apparatus 106 and intermediate product 156 have been moved to the maximum distance from the mold cavity assembly 102, the sum of the forces of the motor 182 and the biasing force of the spring mechanism 130 are transmitted through the flanged end 132 of the stripping rod to the base 144 of the stripping apparatus 106. (See, FIG. 2D). As the diameter of the intermediate product 156 is greater than the diameter of the opening 146, the separator 150 obstructs the intermediate product 156 from passing through the opening 146. Accordingly, the sum of the forces transmitted to the base 144 are further transmitted to the bottom edge 164 of the intermediate product 156 through the separator 150.

When the frictional barrier between the product and the mold core is overcome (as described in detail below), the core assembly 104 is moved from the stripping apparatus 106 and further separated from the mold cavity assembly 102. Consequently, the intermediate product 156 is ejected or separated from the mold core 112. Accordingly, the stripping apparatus 106 is provided with a separator 150 structure that functions as a barrier to obstruct the intermediate product 156 from being withdrawn along with the core assembly 104.

3. Polymer Tube Manufacture Using Injection Molding Apparatus

FIG. 2A illustrates the injection molding assembly 100 at a stage prior to injecting any liquid thermoplastic resin. As can be seen in FIG. 2A, the core assembly 104 and the stripping apparatus 106 are in contact with each other. Moreover, the core assembly and the stripping apparatus are separated at distance from the mold cavity assembly 102. At this stage of the manufacturing process, the core assembly and the stripping apparatus are connected to the mold cavity assembly 102 by the striping rod 126. At this stage in the process, the stripping rod 126 functions as, at least in part, a guide rod.

3.1 Tube Product Formation

FIG. 2B illustrates the injection molding assembly 100 at a stage in the manufacturing process when the liquid thermoplastic material is being introduced into the molding chamber 120 or space between the mold core 112 and the mold cavity wall 110 (see, direction arrows).

In an embodiment, raw thermoplastic pellets or beads are poured into a feed hopper (not shown), which is a large open bottomed container. The feed hopper feeds the granules or pellets down through the open bottom to the rotating screw system or plunger (not shown). In one embodiment, the thermoplastic material is a glass-filled Nylon polymer. However, it should be appreciated that any other suitable thermoplastic material such as polystyrene, ABS or acrylonitrile butadiene styrene, nylon, polypropylene, polyethylene, and polyvinyl chloride ("PVC") may be used.

A hydraulic or electric or other motor turns the screw and the hopper feeds the pellets into grooves in the screw. The screw rotates and moves the pellets forward under increased pressure and increased friction conditions. These increased pressure and friction conditions generate an amount of heat. In an embodiment, heating elements (not shown) on either side of the screw assist in the heating and temperature control of the pellets during the melting process. The screw turns as the heating elements liquidize the pellets and the screw forces the liquid thermoplastic material through the base 108 opening 116 and injection inlet or receiver or port 118 and into the molding chamber 120 (see, FIG. 2B), where the molding chamber is the space between the mold cavity wall and the mold core, when the mold core 112 is inserted in the mold cavity wall 110.

After the molding chamber 120 has been filled with the liquid thermoplastic material, the screw mechanism stops to restrict additional material from entering the molding chamber. The liquid thermoplastic material is either allowed to cool or is cooled by a coolant flowing through a cooling channel or helical conduit 136, as shown in FIG. 2B. In an embodiment, the coolant rapidly cures the liquid thermoplastic material by circulating a liquid or gas through the interior of the mold core 112. As the liquid thermoplastic material cools it transforms to a solid state or cures. At this stage, the thermoplastic material has formed the intermediate product 156, 200 having an end cap 202 (see, FIGS. 3 and 4), where the product is encased within the molding chamber.

When the liquid thermoplastic material cools, it has a tendency to contract due to a thermal contraction characteristic. Accordingly, the intermediate product 156 tends to contract in upon the mold core 112. In addition, the thermoplastic material, as it contracts, tends to separate from the inner wall 160 of the mold cavity wall 110. Accordingly, the cured product separates from the mold cavity wall with relative ease.

Figure 2C:
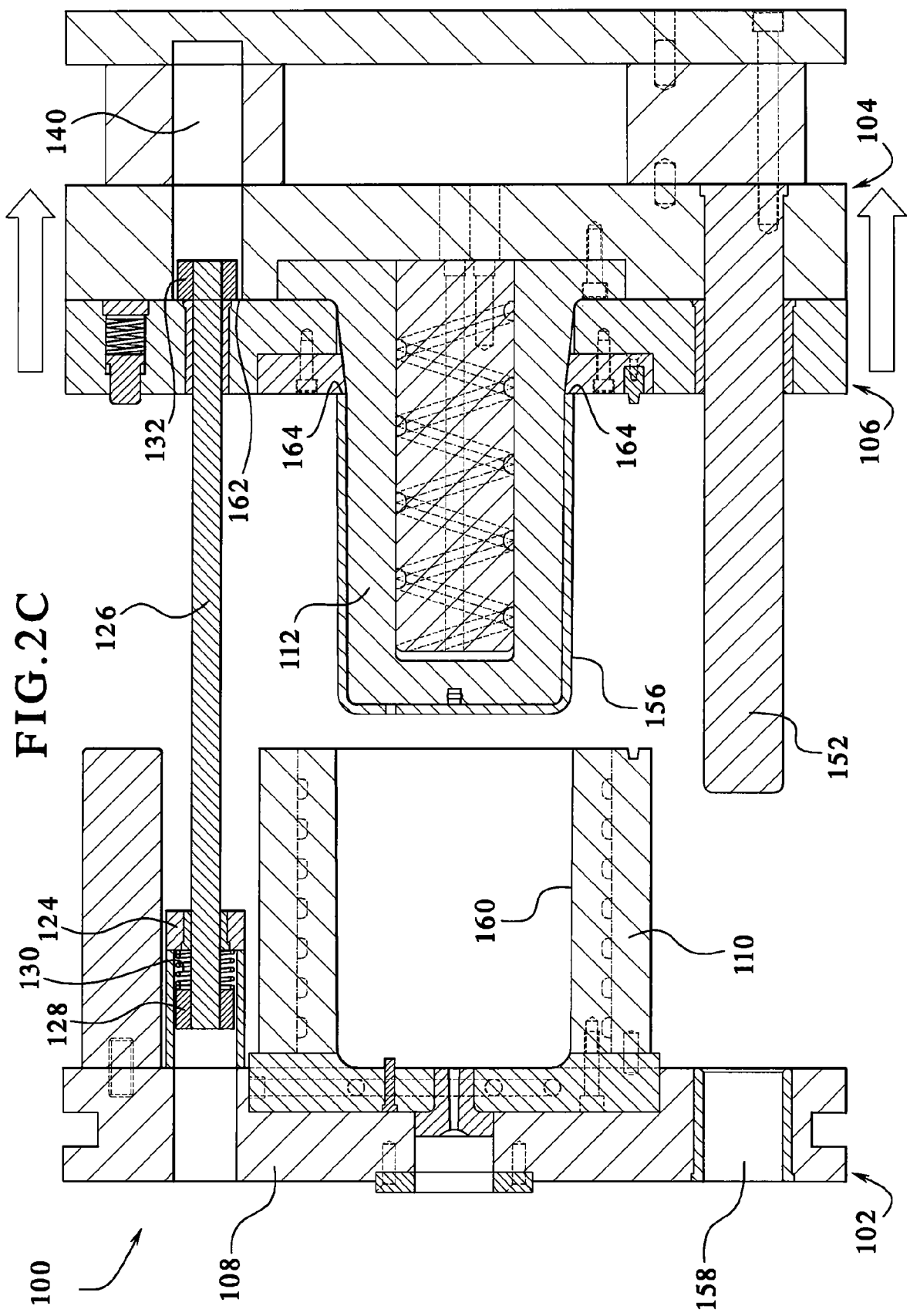
FIG. 2C is a cross-sectional view of the injection molding apparatus after the mold core and product have been withdrawn from the mold cavity wall.

3.2 Movement of Core Assembly and Stripping Apparatus Away From the Mold Cavity Assembly FIG. 2C illustrates the movement of the core assembly 104 and stripping apparatus 106 away from the mold cavity assembly 102. The core assembly and the stripping apparatus are drawn from the mold cavity assembly 102 by a power source 182. As discussed above, the power source 182 may be an electric, electromagnetic, pneumatic or hydraulic motor coupled to the mold core assembly 104 through a coupler 184. The downward facing arrows in FIG. 2C show the magnitude and direction of the movement of the core assembly 104 and stripping apparatus 106. Although, in this embodiment, it is shown that the core assembly 104 and the stripping apparatus 106 move away from the mold cavity assembly 102 (which is in a fixed position), it should be appreciated that in a different embodiment the core assembly 104 may be fixed and the mold cavity assembly 102 could move away from the core assembly 104 and stripping apparatus 106. As the core assembly 104 and the stripping apparatus 106 move away from the mold cavity assembly 102, the main guide rod 152 is withdrawn entirely from the opening 158 of the base or support 108 of the mold cavity assembly 102. Also, the stripping rod 126 moves within the stripping rod holder 122 (see, FIGS. 1A and 1B) such that the flanged end 128 of the stripping rod 126 makes initial contact with the spring mechanism 130. Likewise, the stripping rod 126 moves within the opening 140 of the core assembly 104 such that the second flanged end 132 of the stripping rod 126 makes initial contact with a bottom edge 162 of the support 144 (see, FIG. 1A) of the stripping apparatus.

At this stage, referring again to FIG. 2C, the initial contact of the flanged end 128 of the stripping rod with the spring mechanism 130 and contact of the flanged end 132 with the bottom edge 162 of the stripping apparatus 106 support 144 (see, FIG. 1A) generates an initial force that is transmitted to the support 144. As mentioned briefly above, the motor 182 applies a continuous force through the coupler 184 to the support 138 (see, FIG. 1A). It should also be appreciated that the motor 182 may apply a variable force. Also at this stage, the flanged end 128 of the stripping rod 126 begins to compress the spring mechanism 130. As discussed above, the spring mechanism 130 is retained in a space between the flanged end 128 of the stripping rod 126 and the flanged end 124 of the stripping rod holder 122 of the mold cavity assembly 102. This compression of the spring apparatus 130 generates a biasing force that opposes the separating force of the motor.

3.3 Compression of Spring Mechanism

Figure 2D:
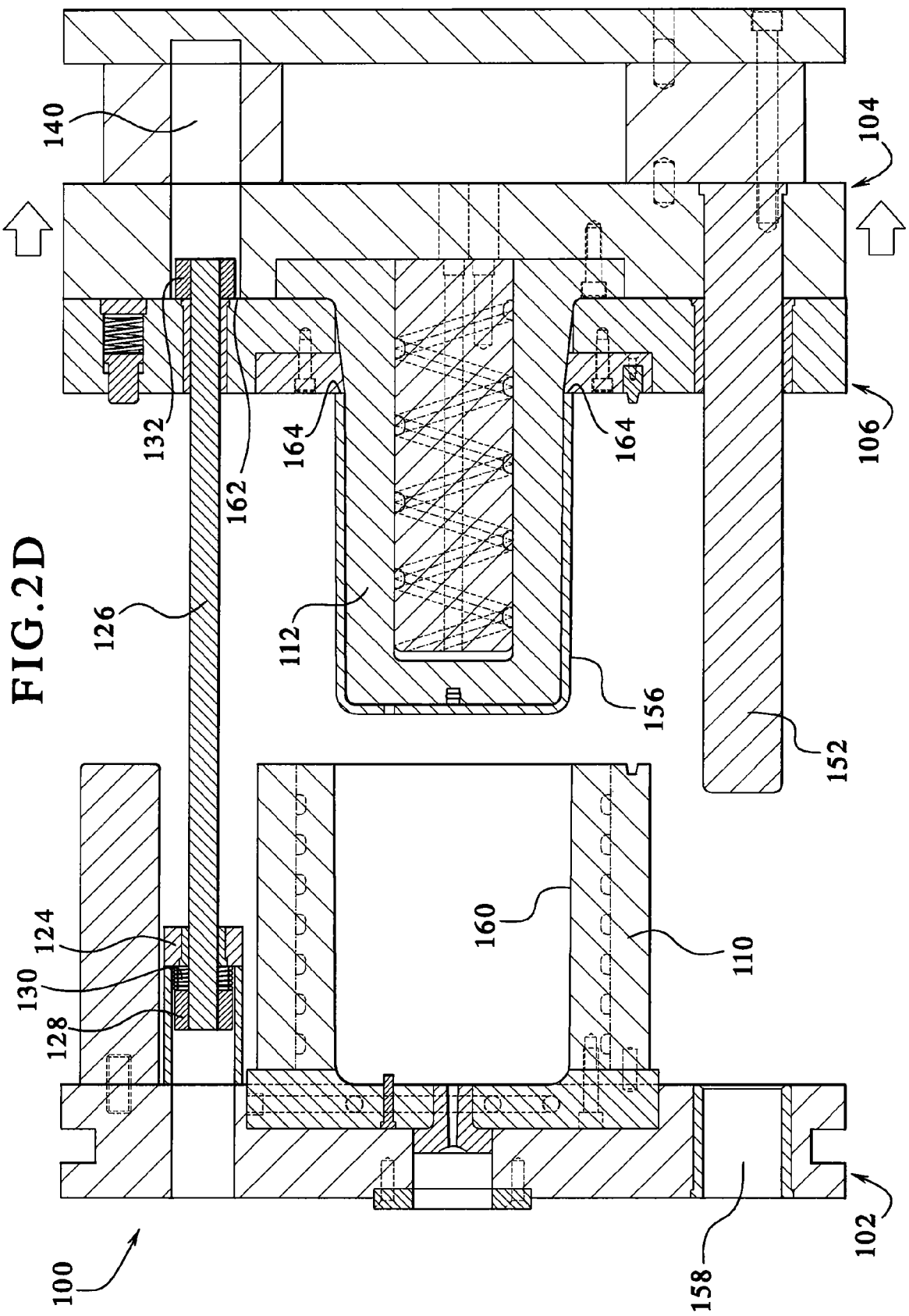
FIG. 2D is a cross-sectional view of the injection molding apparatus where the mold core is moved further away from the mold cavity assembly and the spring mechanism is in a compressed state.

Referring to FIG. 2D, the motor 184 continues to apply a force and moves the core assembly 104 and stripping apparatus 106 a further distance away from the mold cavity assembly 102. The direction and magnitude of the additional distance traveled is represented by the small arrows shown in FIG. 2D. As the core assembly 104 and stripping apparatus 106 continue to move away from the mold cavity assembly 102, the spring mechanism 130 is further compressed by the flanged end 128 of the stripping rod 126, as shown by the compressed helical spring coils in FIG. 2D. At this stage, spring mechanism 130 is fully compressed and the stripping apparatus 106 has reached its maximum separation from the mold cavity assembly 102. However, the core assembly 104 has the potential to move a further distance away from the mold cavity assembly 102 and stripping apparatus 106 because its movement is not limited by the length of the stripping rod 126. The spring mechanism 130 functions, at least in part, to provide a force to the stripping apparatus 106 that is in an opposite direction to the force generated by the motor 182.

When the core assembly 104 reaches the maximum distance from the mold cavity assembly 102, the hydraulic or electric motor (not shown) attempts to withdraw the core assembly 104 a further distance away from the stripping apparatus 106. However, in this example, the frictional force between the intermediate product 156 and the outer wall of the mold core 112 is at least initially greater than the sum of the forces applied by the electric or hydraulic motor and the opposing force of the spring mechanism. In general, the frictional force between the mold core and the product increases as the length of the mold core is increased (i.e., as the length of the intermediate product becomes longer). This is due to the increased surface area between the product and the mold core. The frictional force between the mold core and the product is also a function of any taper that is applied to the mold core. For example, there is less frictional resistance to eject a bucket shaped product than there is to eject a true cylindrical or nearly cylindrical product because as the tapered product initially separates, the frictional resistance is reduced to nearly zero. As mentioned above, there is a disadvantage to using a mold core having a significant taper because this can result in relatively large amounts of excess material that must be trimmed off the product to form piston rings, where each piston ring requires a substantially constant inside diameter.

It should be appreciated that although the injection molding assembly 100 including the spring mechanism 130 can function to separate or eject a non-tapered or nearly non-tapered cylindrical product, the spring mechanism 130 is also operable to eject or separate products having a taper as well as products having irregular or non-uniform shapes, including non-cylindrical shapes.

Accordingly, the spring mechanism 130 provides an initial shock to the bottom edge of the product 164 by the stripping apparatus 106 when the limits of motion are achieved and provides a reinforcing effect to aid in the eventual product ejection after the initial contact and reaction of the bottom edge 164. In this example, there is a repetitive oscillation or force shock applied to the intermediate product 156 to contribute to overcoming the frictional forces between the outer wall of the mold core 112 and the intermediate product 156. Accordingly, the intermediate product 156 is ejected after a number of additional cycles. However, it should be appreciated that in a different embodiment, the force of the motor in combination with the opposing or biasing force of the spring mechanism 130 may be sufficient to eject the intermediate product 156 on the first step or cycle.

3.4 Reaction Motion of Stripping Apparatus and Core Assembly

Figure 2E:
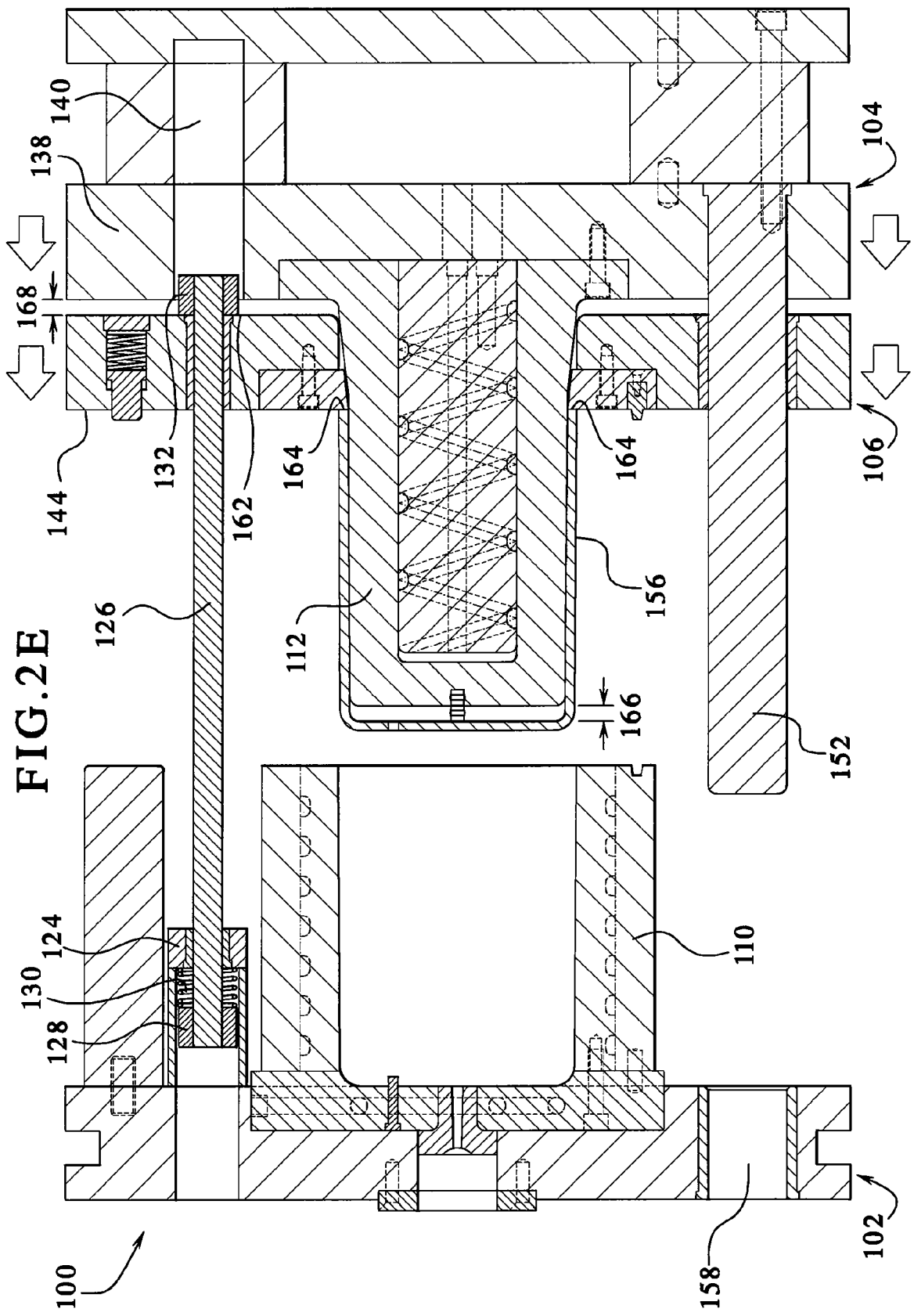
FIG. 2E is a cross-sectional view of the injection molding apparatus shown after one or more spring compression/expansion cycles where the stripping apparatus has separated the product from at least a portion of the mold core.

Referring now to FIG. 2E, after the stripping apparatus 106 has reached its maximum distance from the mold cavity assembly and the spring mechanism has been fully compressed, the sum of the biasing force of the spring mechanism 130 and the frictional force between the product and the mold core is sufficient to overcome, at least temporarily, the force of the motor that is attempting the draw the stripping apparatus 106 and core assembly 104 away from the mold cavity assembly 102. Accordingly, there is a reaction movement of the core assembly 104 and stripping apparatus 106 back toward the mold cavity assembly 102. The direction and magnitude of this reaction movement is illustrated by the small arrows in FIG. 2E. These arrows next to both the stripping apparatus 106 and core assembly 104 indicate that both of these assemblies are moving in tandem the same distance. During this reaction movement the forces exerted at the bottom edge of the product 164 from the second flanged end 132 of the stripping rod are reduced.

In one embodiment, the injection molding apparatus 100 or motor 182 includes a sensor that indicates whether the intermediate product 156 has been ejected. In this embodiment, the sensor transmits an instruction to a processor controlling the motor 182 to at least temporarily reduce or shut off power to the motor 182 to allow the stripping apparatus 106 and core assembly 104 to return to a previous position where the spring mechanism 130 is in an uncompressed state.

Referring to FIG. 2E, the injection molding assembly 100 has completed one force shock cycle. However, it should be appreciated that FIG. 2E may represent the position of the injection molding assembly 100 components after any number of cycles such as one, five, or ten. In the illustrated example, the intermediate product 156 has separated a certain distance 166 from the mold core 112 on the $x^{th}$ ejection attempt cycle. This distance 166 corresponds to the distance of separation between the support 144 of the stripping apparatus 106 and the support 138 of the core assembly 104, which is represented by reference numeral 168. In this illustrated example, there was enough force generated to at least partially eject the intermediate product 156 from the mold core, but not to fully eject same. Accordingly, at least one more cycle is required prior to fully ejecting the intermediate product 156 from the mold core 112. Although the example shown in FIG. 2E is shown to have the product partially ejected from the mold core, it should be appreciated that in another example the product would not partially eject prior to full ejection (i.e., the ejection of the product would occur completely during one ejection attempt cycle).

3.5 Product Ejection from Core Assembly

Figure 2F:
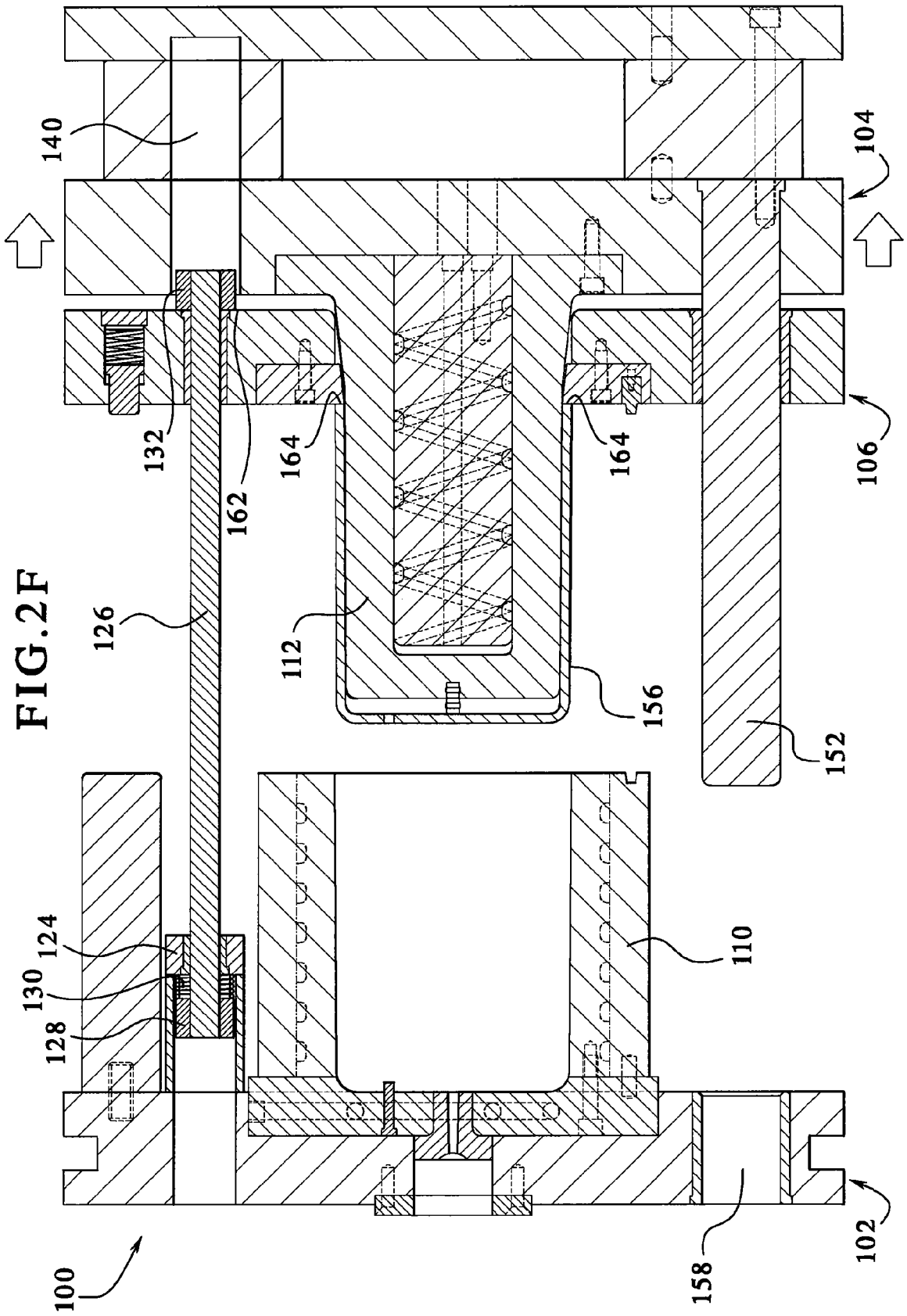
FIG. 2F is a cross-sectional view of the injection molding apparatus where the mold core is moved further away from the mold cavity assembly and the spring mechanism is again in a compressed state.

Referring to FIG. 2F, after the spring mechanism 130 has returned to a fully uncompressed state, the motor 182 again moves the core assembly 104 away from the mold cavity assembly 102. The direction and magnitude of the distance traveled is represented by the small arrows shown in FIG. 2F. As the core assembly 104 and stripping apparatus 106 continue to move away from the mold cavity assembly 102, the spring mechanism 130 is again compressed by the flanged end 128 of the stripping rod 126, as shown by the compressed helical spring coils in FIG. 2D. At this stage, spring mechanism 130 is fully compressed and the stripping apparatus 106 has reached its maximum separation from the mold cavity assembly 102. As mentioned above, the core assembly 104 has the potential to move a further distance away from the mold cavity assembly 102 and stripping apparatus 106 because its movement is not limited by the length of the stripping rod 126.

When the core assembly 104 reaches the maximum distance from the mold cavity assembly 102, the hydraulic or electric motor 182 again moves the core assembly 104 a further distance away from the stripping apparatus 106. In this $x^{th}$ cycle, the frictional force between the intermediate product 156 and the outer wall of the mold core 112 is overcome by the sum of the forces applied by the electric or hydraulic motor 182 and the opposing or biasing force of the spring mechanism 130. As previously discussed with regard to FIG. 2D, the spring mechanism 130 provides an initial dampening effect that absorbs at least a portion of the shock to the bottom edge 164 of the intermediate product 156 by the stripping apparatus 106 when the limits of motion are achieved, and further provides a reinforcing effect to aid in ejection of the intermediate product 156 after the contact of the bottom edge 164. In other words, the motor 182 continues to apply a force to move the mold core 112 away from the intermediate product 156 at the same time that the biasing force of the spring mechanism 130 is attempting to move the stripping apparatus away from the core assembly 104.

Figure 2G:
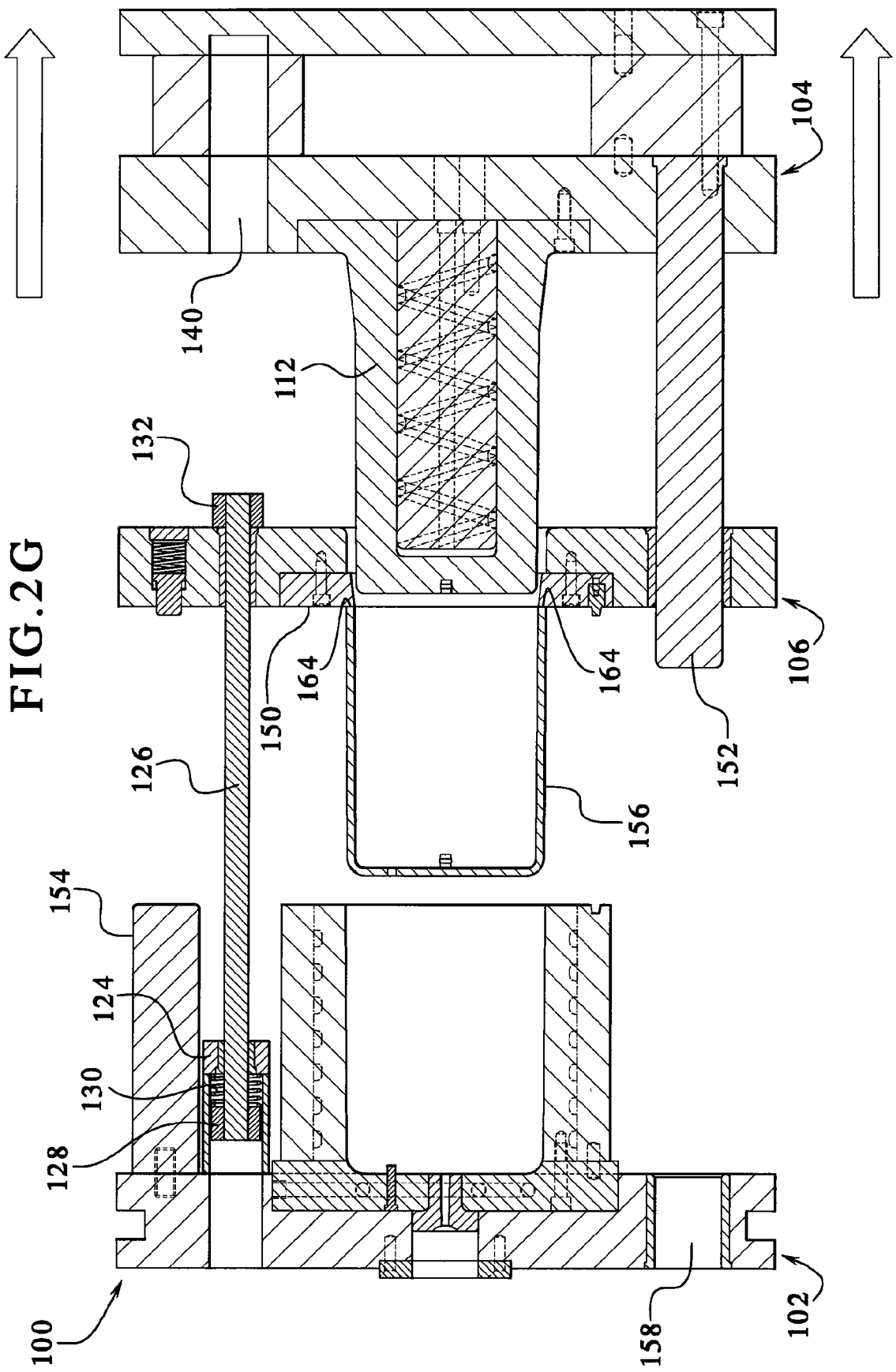
FIG. 2G is a cross-sectional view of the injection molding apparatus where the stripping apparatus has completely separated the product from the mold core.

In the example shown in FIG. 2G, the $x^{th}$ attempt to eject the intermediate product 156 from the mold core 112 is successful because the sum of the forces of the motor 182 and the spring mechanism 130 are greater than the frictional forces between the outer wall of the mold core 112 and the intermediate product 156. Accordingly, the mold core 112 slides out of the intermediate product 156 cavity and the intermediate product 156 is thus ejected or separated from the core assembly 112. At this stage, the intermediate product 156 may be retrieved by an operator or may be transferred by a conveying system to a separate location or storage bin for further processing.

The spring mechanism 130 provides a reinforcing effect to the force applied by the motor 182 to aid in separating the intermediate product 156 from the mold core 112. Thus, the additional separating force provided by the spring mechanism 130 assists the motor 182 in overcoming the opposing frictional forces at the interface of the intermediate product 156 and the mold core 112. Therefore, the intermediate product 156 is able to be ejected from the mold core 112 even when the mold core 112 has an increased length, relatively little or no taper, and/or irregular or non-uniform shape. In other words, the additional friction caused by little or no taper and added length to the mold core 112 is overcome by the reinforcing effects provided by the spring mechanism 130 and other mechanical or dynamic effects. Therefore, the inner surface of intermediate product 156 has a relatively minor taper which reduces the amount of material that must be subsequently trimmed off and recycled. This results in a product having improved dimensional tolerances. Also, a longer intermediate product 156 may be sliced into a plurality of piston rings. Accordingly, improvements in manufacturing efficiency and product tolerances are realized.

4. Processing of Intermediate Product to form Piston Rings

Figure 3:
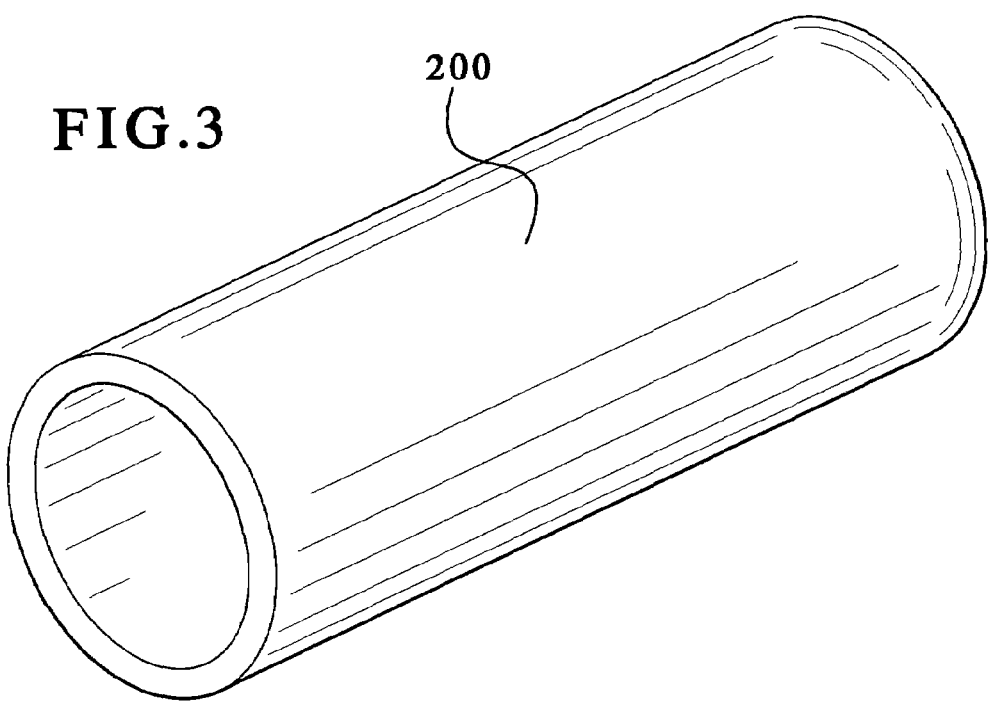
FIG. 3 is a perspective view of the tube shaped intermediate product.
Figure 4:
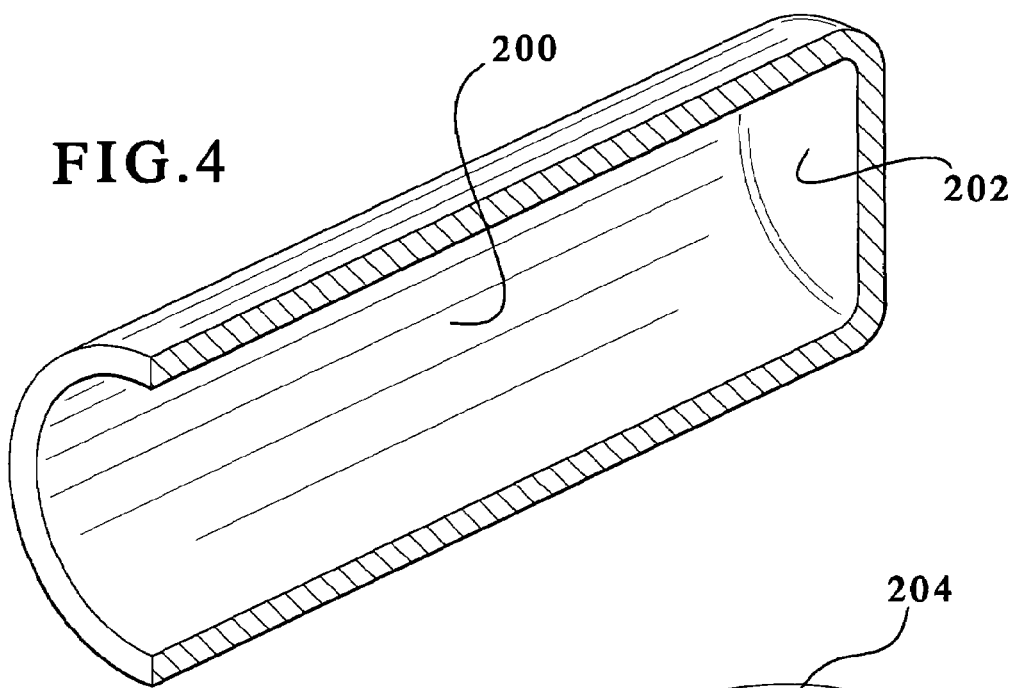
FIG. 4 is a partial perspective view of the tube intermediate shaped product showing an end cap formed on one end of the product.
Figure 5:
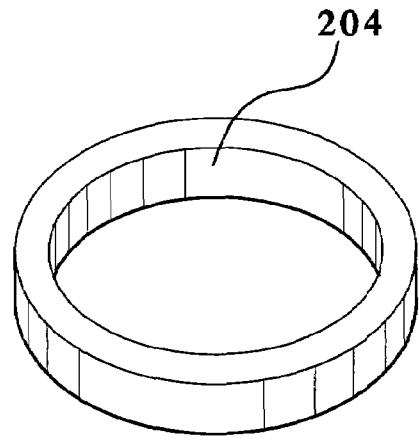
FIG. 5 is a perspective view of a sealing ring.

FIG. 3 illustrates the intermediate product 200 after it has been separated or ejected from the mold core 112. As shown in FIG. 4, the intermediate product 200 has an end cap 202 portion. The end cap 202 provides additional structural rigidity to the intermediate product 200. As noted above, the intermediate product 200 has a substantially cylindrical shape with a minimal amount of taper or no taper to the inside or outside surfaces. As described in detail below, the intermediate product 200 may be divided into a plurality of piston rings 204, as shown in FIG. 5. The piston rings 204 may be split or cut such that the piston rings 204 can be mounted around an annular groove provided in a piston body (not shown).

Figure 6A:
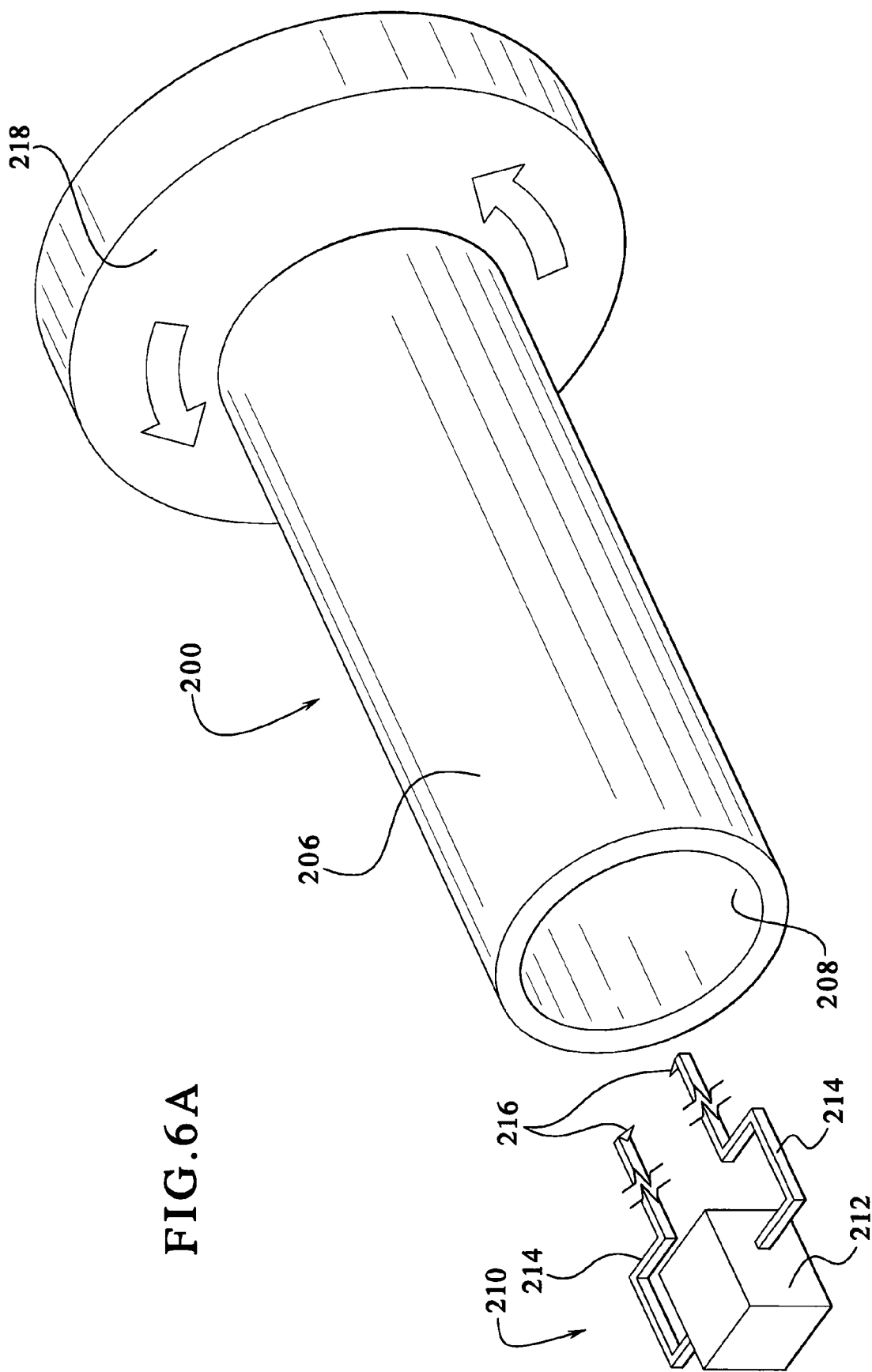
FIG. 6A is a perspective view of the tube shaped intermediate product mounted to a rotating vacuum chuck prior to a trimming step.
Figure 6B:
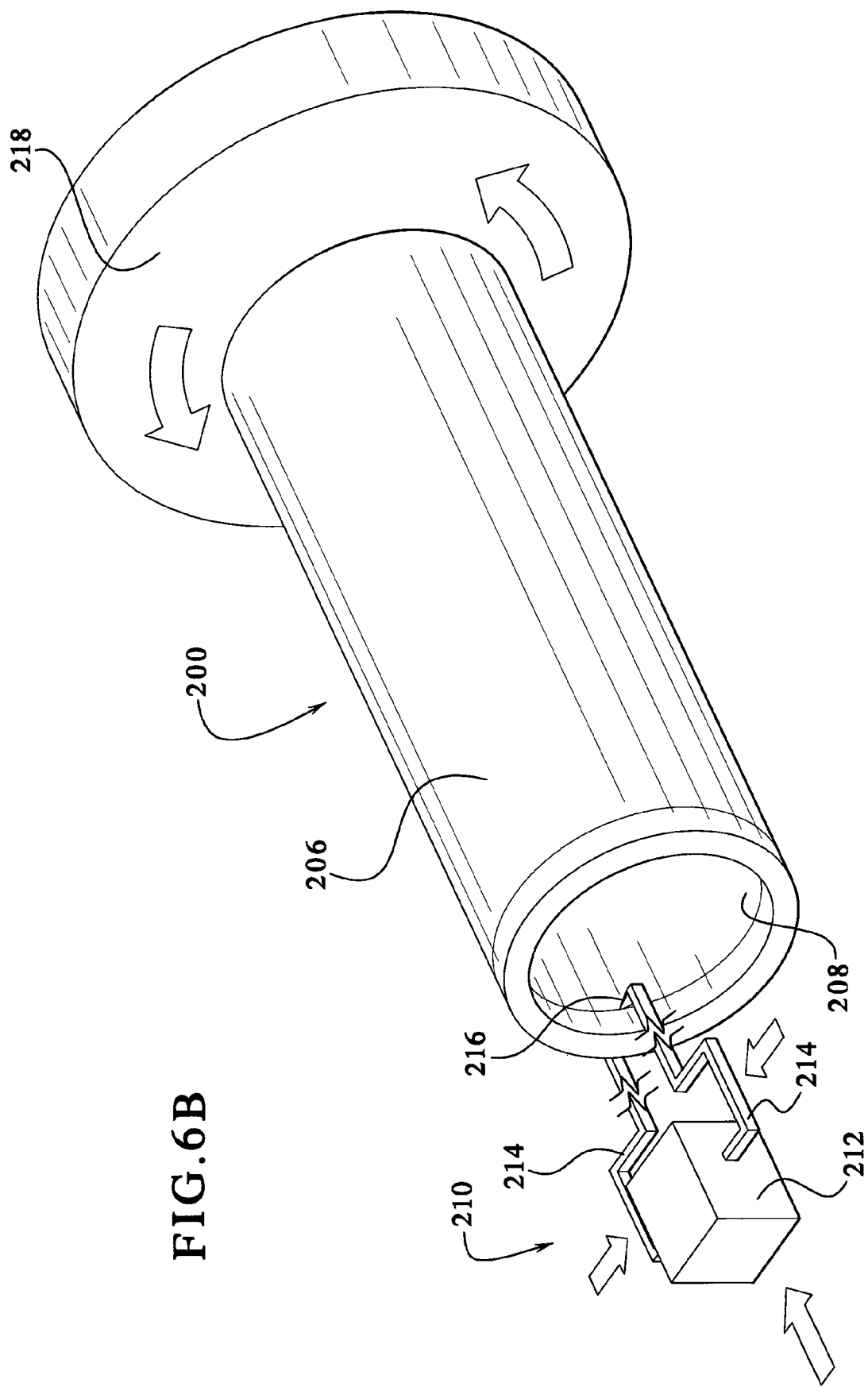
FIG. 6B is a perspective view of the tube shaped intermediate product during a trimming operation.

FIG. 6A and 6B illustrate an embodiment where the outside surface 206 and inside surface 208 of the intermediate product 200 are trimmed to a desired tolerance by a retractable trimming apparatus 210. In one embodiment, the intermediate product 200 is mounted to a chuck 218 of a rotating lathe. The open end of the intermediate product is proximal to the cutting apparatus and the end cap 202 (see, FIG. 4) of the intermediate product 200 is mounted to the chuck 218. In an embodiment, the chuck 218 is a vacuum chuck having one or more vacuum channels or holes formed into a surface. The flat surface of the end cap 202 is adhered to the vacuum chuck 218 and rotated in a given direction, as indicated by the directional arrows shown in FIG. 6A. It should be appreciated that the intermediate product 200 may be affixed to the rotating lathe in any suitable manner such as with a clamping mechanism.

The trimming apparatus 212 includes a body portion 212 and two retractable arms 214. Each of the retractable arms 214 include a trimmer 216. In an embodiment, a processor causes the arms 214 to retract and release during a cutting operation. It should be appreciated that the arms 214 may also be pivoted or otherwise adjusted to move the trimmers 216 into the desired position. FIG. 6B illustrates the trimming apparatus 210 during the process of trimming the intermediate product 200. The arms 214 are retracted inward such that the trimmers 216 contact and remove a portion of the intermediate product 200 as the trimming apparatus 212 moves toward and engages the open end of the intermediate product 200. The directional arrows in FIG. 6B indicate the movement of the retractable arms 214 and the movement of the trimming apparatus 210 with respect to the intermediate product 200. After the trimming apparatus 212 has trimmed excess material, the arms 214 are moved apart and the trimming apparatus 212 is retracted from the intermediate product 200. The trimmed product has a desired thickness and concentricity.

In an embodiment, the intermediate product 200 is then divided or sliced into a plurality of piston rings 204 (as shown in FIG. 5) with a separate cutting device (not shown) and any excess material and end cap 202 are recycled.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A molding assembly comprising:
   a mold cavity assembly including a cavity wall defining a mold cavity;
   a product remover movably coupled to the mold cavity assembly;
   a mold core assembly movably coupled to the product remover, the mold core assembly including a mold core that is insertable into at least a portion of the mold cavity to at least partially define a space fillable by a flow of material to be solidified into a product; and
   a force transceiver configured to store at least a portion of energy associated with movement of the mold core away from the mold cavity wall, and configured to release at least part of the stored energy to facilitate removal of the product from the mold core.

2. The molding assembly according to claim 1, wherein the mold core, the mold cavity wall, and the product remover define the space.

3. The molding assembly according to claim 1, wherein the mold core and the mold cavity wall are substantially cylindrical.

4. The molding assembly according to claim 1, wherein the product remover and the mold cavity assembly are coupled by a member that is slidably coupled to both the product remover and the mold cavity assembly.

5. The molding assembly according to claim 4, wherein the member is a cylindrical rod that includes a first flanged end engageable with a holder of the mold cavity assembly, and a second flanged end engageable with a portion of the product remover, wherein the first flanged end and the second flanged end obstruct movement of the product remover away from the mold cavity assembly beyond a predetermined distance.

6. The molding assembly according to claim 5, wherein the force transceiver is disposed between the first flanged end of the member and the holder.

7. The molding assembly according to claim 1, wherein the force transceiver is selected from the group consisting of: a helical compression spring, a helical tension spring, a leaf spring, a torsional spring, a pneumatic shock absorber, a hydraulic shock absorber, a rubber disk, a rubber band, an elastic cord, a magnetic system, and an electromagnetic system.

8. The molding assembly according to claim 1, wherein the release of the energy from the force transceiver is a biasing force transmitted through the portion of the product remover to a portion of the molded part.

9. The molding assembly according to claim 1, wherein the force transceiver is configured to compress when the product remover moves away from the mold cavity assembly a predetermined distance, thereby storing energy.

10. The molding assembly according to claim 9, wherein the predetermined distance is based on a length of the member.

11. The molding assembly according to claim 9, wherein the force transceiver is configured to decompress and release the stored energy, thereby urging the product remover to move toward the mold cavity assembly.

12. A part fabrication apparatus comprising:
    a mold cavity assembly including a substantially cylindrical cavity wall defining a mold cavity;
    a part removal plate movably coupled to the mold cavity assembly by a member;
    a mold core assembly including a substantially cylindrical mold core, the mold core insertable through an opening in the part removal plate and insertable into at least a portion of the mold cavity so as to define a space fillable by a flow of material to be solidified into a part;
    a power source coupled to the mold core assembly and configured to urge the mold core assembly away from the mold cavity assembly during part removal; and
    a force transceiver configured to store at least a portion of energy associated with movement of the mold core away from the mold cavity wall, and configured to release at least a portion of the stored energy to facilitate removal of the part from the mold core.

13. The part fabrication apparatus according to claim 12, wherein the force transceiver is selected from the group consisting of: a helical compression spring, a helical tension spring, a leaf spring, a torsional spring, a pneumatic shock absorber, a hydraulic shock absorber, a rubber disk, a rubber band, an elastic cord, a magnetic system, and an electromagnetic system.

14. The part fabrication apparatus according to claim 12, wherein the part is a substantially cylindrical tube including an end cap.

15. The part fabrication apparatus according to claim 12, wherein the mold core includes a closed end having a curved peripheral edge.

16. The part fabrication apparatus according to claim 12, wherein the member includes a first flanged end engageable with a holder of the mold cavity assembly, and a second flanged end engageable with a portion of the product removal plate, wherein the first flanged end and the second flanged end obstruct movement of the part removal plate away from the mold cavity assembly beyond a predetermined distance.

17. The part fabrication apparatus according to claim 12, wherein the part removal plate and the mold core assembly are configured to repeatedly move toward and away from the mold cavity assembly during a given part ejection cycle.

18. The part fabrication apparatus according to claim 17, wherein the force transceiver periodically releases the stored energy to repeatedly urge the part removal plate toward the mold cavity assembly during a given part ejection cycle.

19. The part fabrication apparatus according to claim 18, wherein the opening of the part removal plate has a diameter less that the outside diameter of the part, thereby blocking movement of the part through the opening.

20. An injection molding assembly comprising:
 a mold cavity assembly including a base, a substantially cylindrical mold cavity wall, and a holder having a flanged end, the mold cavity wall defining a mold cavity;
 a stripping rod movably coupled to the base of the mold cavity assembly and having a first flanged end and second flanged end, the first flanged end of the stripping rod configured to repetitively compress and decompress a spring mechanism disposed between the first flanged end of the stripping rod and the flanged end of the holder;
 a core assembly movably connected to the mold cavity assembly, the core assembly having a base, a substantially cylindrical mold core attached to the base, an outer diameter of the mold core being less than an inner diameter of the mold cavity wall, the mold cavity wall configured to receive at least a portion of the mold core so as to define a space fillable by a flow of material to be solidified into a product;
 a stripping plate movably coupled to the mold cavity assembly and disposed between the mold cavity assembly and the core assembly, the stripping plate including a first opening configured to receive the cylindrical mold core, and a second opening configured to block the second flanged end of the stripping rod.

21. The injection molding assembly according to claim 20, wherein a length of the mold core is greater than the inner diameter of the mold cavity wall.

22. The injection molding assembly according to claim 20, wherein a length of the product is greater than an outside diameter of the product.

* * * * *